United States Patent
Hasegawa et al.

(10) Patent No.: US 7,186,788 B2
(45) Date of Patent: Mar. 6, 2007

(54) (METH)ACRYLIC COPOLYMER RESIN AND COATING FILM THEREOF

(75) Inventors: Yugo Hasegawa, Sodegaura (JP); Tsukasa Murakami, Sodegaura (JP); Keiichi Asami, Sodegaura (JP)

(73) Assignee: Mitsui Chemicals, Inc., Tokyo (JP)

( * ) Notice: Subject to any disclaimer, the term of this patent is extended or adjusted under 35 U.S.C. 154(b) by 0 days.

(21) Appl. No.: 10/521,179

(22) PCT Filed: Jul. 28, 2003

(86) PCT No.: PCT/JP03/09526

§ 371 (c)(1),
(2), (4) Date: Jan. 14, 2005

(87) PCT Pub. No.: WO2004/011564

PCT Pub. Date: Feb. 5, 2004

(65) Prior Publication Data

US 2005/0222321 A1    Oct. 6, 2005

(30) Foreign Application Priority Data

Jul. 31, 2002    (JP) .............................. 2002-222343

(51) Int. Cl.
- C08F 20/02    (2006.01)
- C08F 20/62    (2006.01)
- C08F 20/54    (2006.01)

(52) U.S. Cl. ................ 526/317.1; 526/319; 526/303.1; 526/348.1

(58) Field of Classification Search ................ 524/556; 526/317.1, 319, 303.1, 348.1
See application file for complete search history.

(56) References Cited

U.S. PATENT DOCUMENTS

| | | | | |
|---|---|---|---|---|
| 3,048,501 A | * | 8/1962 | Miller et al. ................ 428/452 |
| 4,692,396 A | * | 9/1987 | Uchida ..................... 430/284.1 |
| 4,770,795 A | * | 9/1988 | Giddings et al. ........... 507/121 |
| 4,822,727 A | * | 4/1989 | Ishigaki et al. ............. 430/536 |
| 5,536,627 A | * | 7/1996 | Wang et al. ................. 430/523 |
| 6,013,724 A | | 1/2000 | Mizutani et al. |

FOREIGN PATENT DOCUMENTS

| | | | |
|---|---|---|---|
| JP | 61-268731 A | | 11/1986 |
| JP | 62-132973 | * | 6/1987 |
| JP | 63-286471 A | | 11/1988 |
| JP | 07-156567 A | | 6/1995 |
| JP | 10-017689 A | | 1/1998 |
| JP | 10-130338 | * | 5/1998 |
| JP | 10-130338 A | | 5/1998 |
| JP | 11-181334 A | | 7/1999 |
| JP | 2000-144049 A | | 5/2000 |

* cited by examiner

Primary Examiner—Ling-Sui Choi
(74) Attorney, Agent, or Firm—Buchanan, Ingersoll & Rooney PC

(57) ABSTRACT

A coating resin that is thermoplastic, exhibits good appearance, solvent resistance and adherence and is excellent in abrasion resistance; and a coting liquid or coating film thereof. In particular, a (meth)acrylic copolymer resin (A) produced by radical polymerization of 4 to 50 mass % of (meth)acrylic acid (a-1), 0.5 to 17 mass % of (meth)acrylamide (a-2), and 35 to 95.5 mass % of a compound having reactive unsaturated bond other than the compounds (a-1) and (a-2). With respect to the coating film produced therefrom, both the glass transition temperature Tg1 measured by means of a rigid-body pendulum type viscoelasticity measuring instrument and the glass transition temperature Tg2 measured by means of a differential scanning calorimeter (DSC) are 110° C. or higher. The coating film is an abrasion resistant film whose abrasion resistance measured in accordance with the Taber abrasion testing method is 80 rotations or greater.

8 Claims, No Drawings

(METH)ACRYLIC COPOLYMER RESIN AND COATING FILM THEREOF

TECHNICAL FIELD

The present invention relates to (meth)acrylic copolymer resin and a coating film comprising the same, which is excellent in outward appearance, solvent resistance and adhesion upon coating and drying on metal and plastic materials of vehicles, automobile parts, home appliances, instruments etc., and superior in wear resistance.

BACKGROUND ART

To prevent scratch and wear of metal and plastic materials of vehicles, automobile parts, home appliances, instruments etc., a method of improving durability against scratch and wear by applying and forming a coating film on such materials has been proposed. A coating film formed for the purpose of preventing scratch and wear of such materials is classified into crosslinked thermosetting resin and non-crosslinked thermosetting resin, and the former crosslinked resin is often used from the viewpoint of wear resistance. Proposed methods of making the crosslinked resin involve irradiation with UV or EB (JP-A 10-17689), applying heat energy (JP-A 11-181334) or reacting with isocyanate at room temperature (JP-A 11-181334 and JP-A 2000-144049) to crosslink resin with the curing agent. However, these methods often require additional UV or EB facilities or much heat energy for crosslinking reaction and several hours for drying. Further, the crosslinked coating film is problematic in treatment for disposal or in recycling etc.

Because of such problems in crosslinking and drying conditions for forming a coating film, a coating film of low-temperature-drying and non-crosslinked thermoplastic resin is desired and proposed (JP-A 7-156567), but does not realize performance such as sufficient wear resistance.

DISCLOSURE OF INVENTION

The object of the present invention is to provide a coating film (or film) [hereinafter we call coating film] comprising thermosetting coating resin, particularly (meth)acrylic copolymer resin, which is excellent in outward appearance, solvent resistance and adhesion and is superior in wear resistance.

The present invention comprises the following constitution:

1. A wear-resistant coating film comprising (A) (meth) acrylic copolymer resin, wherein the glass transition temperature (Tg1) thereof as determined by a rigid pendulum viscoelastometer and the glass transition temperature (Tg2) thereof as determined by a differential scanning calorimeter (DSC) are 110° C. or more respectively, and the wear resistance thereof as determined by a Taber abrasion testing method is 80 times or more.
2. The coating film according to claim 1, wherein the difference among the glass transition temperature (Tg1) as determined by a rigid pendulum viscoelastometer, the glass transition temperature (Tg2) as determined by a differential scanning calorimeter (DSC) and the glass transition temperature (Tg3) calculated from a monomer composition constituting the coating film is 30° C. or more.
3. A (meth)acrylic copolymer (A) wherein the calculated glass transition temperature (Tg3) thereof is 50 to 150° C.
4. A (meth)acrylic copolymer resin (A) having a weight-average molecular weight (Mw) of 20,000 or more, produced by radical polymerizing (a-1) 4 to 50 wt % (meth)acrylic acid, (a-2) 0.5 to 17 wt % (meth)acrylic acidamide, and (b) 35 to 95.5 wt % compound having a reactive unsaturated bond other than (a-1) and (a-2).
5. A coating solution comprising the resin according to the above-mentioned 4 dissolved in an organic solvent (B).

BEST MODE FOR CARRYING OUT THE INVENTION

The object of the present invention is to provide a thermoplastic coating resin excellent in outward appearance, solvent resistance and adhesion and superior in wear resistance, as well as a coating solution and coating film comprising the same.

The present inventors paid attention to the abrasive wear of (meth)acrylic copolymer resin, to examine improvements in wear resistance of its coating film. The present inventors paid attention to the glass transition temperature of (meth) acrylic copolymer resin, that is, the glass transition temperature (Tg1) as determined by a rigid pendulum viscoelastometer, the glass transition temperature (Tg2) as determined by a differential scanning calorimeter (DSC) and the glass transition temperature (Tg3) calculated from a monomer composition constituting the coating film. As a result of extensive study, we found that when the glass transition temperature (Tg1, Tg2) as determined by a rigid pendulum viscoelastometer and a differential scanning calorimeter (DSC) respectively are 110° C. or more, a wear-resistant coating film having a wear resistance of 80 times or more as determined by a Taber abrasion testing method can be obtained, and further found that when the difference between the glass transition temperature (Tg1, Tg2) as determined by a rigid pendulum viscoelastometer and a differential scanning calorimeter (DSC) and the glass transition temperature (Tg3) calculated from a monomer composition constituting the coating film is 30° C. or more, the (meth)acrylic copolymer resin is a coating film excellent in outward appearance, solvent resistance and adhesion and superior in wear resistance, and the present invention was thereby completed.

Coating Film

The glass transition temperature (Tg1, Tg2) of the coating film, as determined by a rigid pendulum viscoelastometer and a differential scanning calorimeter (DSC) in the present invention, is in the range of 110 to 250° C., preferably 120 to 250° C., more preferably 130 to 250° C. When the glass transition temperature is less than 110° C., the formed coating film is poor in hardness and wear resistance, while when the glass transition temperature is higher than 250° C., the coating film is hard and brittle and poor in hardness and abrasiveness.

The wear resistance of the coating film as determined by a Taber abrasion testing method in the present invention is 80 times or more, preferably 200 time or more.

The difference between the glass transition temperature (Tg1, Tg2) of the coating film as determined by a rigid pendulum viscoelastometer and a differential scanning calorimeter (DSC) and the glass transition temperature (Tg3) calculated from a monomer composition constituting the coating film is 30° C. or more. When the difference is 30° C. or less, the coating film fails to exhibit sufficient wear resistance.

The calculated glass transition temperature (Tg3) of the (meth)acrylic copolymer (A) is in the range of 50 to 140° C., preferably 75 to 140° C., more preferably 100 to 140° C. When the glass transition temperature (Tg3) is less than 50° C., the coating film fails to exhibit sufficient wear resistance. When the glass transition temperature (Tg3) is higher than 140° C., the coating film is rendered hard and brittle to lower wear resistance adversely.

In the glass transition temperature (Tg1) determined by a rigid pendulum viscoelastometer, described in item 1 in the present invention, a measuring device DDV-OPA III manufactured by A&D was used. In this measurement, a coating plate formed according to a method of forming a coating film was heated at a rate of 5° C./min. in a thermostatic chamber at 25° C. and then measured for its periodic change against temperature with a 6 mm pipe pendulum vibrated for an inherent period of 0.6 second, to determine the rate of change, and its inflection point was expressed as the glass transition temperature Tg1 by this rigid pendulum viscoelasticity measuring method.

The glass transition temperature Tg2 determined by a differential scanning calorimeter (DSC) described in item 1 in the present invention was determined by a measuring device DSC-60A manufactured by Shimadzu Corporation. In this measurement, 10 mg sample was accurately weighed, then subjected to pretreatment by heating at a rate of 30° C./min. from 25° C. to 250° C. and then cooled at a rate of 10° C./min. from 250° C. to 25° C. After the pretreatment, the sample was heated as a standard sample at 10° C./min. with alumina, and the peak of thermal change was expressed as glass transition temperature Tg2.

The Taber abrasion testing method described in item 1 in the present invention was conducted according to an abrasion testing method (JIS K5600-5-9) (ISO 7784-2: 1997). In the measurement method, the abrasion test was carried out by a wear ring method (CS10F, loading 500 g) wherein the number of revolutions was read with naked eyes until the coating film was shaved or the coating film was removed from a base material.

The glass transition temperature Tg3 calculated from a monomer composition constituting the coating film described in item 2 in the present invention can be determined from a known method (Fox formula). The Fox formula is for calculating the Tg of copolymer from the Tg of homopolymer of each of monomers forming the copolymer, and is detailed in Bullet in of the American Physical Society, Series 2, Vol. 1, No. 3 page 123 (1956)). The Tg of a compound having various reactive unsaturated bonds as a basis for calculation of the Tg of copolymer by the Fox formula can make use of numerical values described in Table 10-2 (main starting monomers of coating acrylic resin) on pages 168–169 in Shin Kobunshi Bunko (New Polymer Library), vol. 7, Introduction to Synthetic Resin for Coating (authored by Kyozo Kitaoka, Kobunshi Kankokai, Kyoto, 1974).

The thickness of the coating film is usually in the range of 1 to 50 μm, preferably 1 to 20 μm, more preferably 1 to 10 μm.

(A) (Meth)acrylic Copolymer Resin

Now, the (meth)acrylic copolymer resin (A) is described.

The (meth)acrylic copolymer resin (A) is a copolymer resin obtained by radical-polymerizing a composition consisting of (a-1) (meth)acrylic acid, (a-2) (meth)acrylic acid amide, and a reactive unsaturated bond-containing compound (b) other than (a-1) and (a-2), wherein the weight ratio of (a-1)/(a-2)/(b) is (4to50)/(0.5to17)/(35to95.5). The total amount of (a-1), (a-2) and (b) is 100 wt % (this applies here in after). Preferably, the weight ratio of (a-1)/(a-2)/(b) is (10 to 40)/(3 to 13)/(47 to 87). More preferably, the weight ratio of (a-1)/(a-2)/(b) is (20 to 30)/(5 to 10)/(60 to 75).

When the (meth)acrylic acid (a-1) is less than 4 wt %, the wear resistance of the coating film is deteriorated. On the other hand, when the (meth)acrylic acid (a-1) is higher than 50 wt %, the resulting coating film is made hard and brittle thus failing to achieve desired wear resistance. When the (meth)acrylic acid amide (a-2) is less than 0.5 wt %, the wear resistance of the coating film is deteriorated. On the other hand, when the (meth)acrylic acid amide (a-2) is higher than 17 wt %, the resulting coating film is made hard and brittle thus failing to attain desired wear resistance. When the reactive unsaturated bond-containing compound (b) other than (a-1) and (a-2) is less than 35 wt %, the coating film is poor in film formability to cause defects in the formed coating film. On the other hand, when the compound (b) is higher than 95.5 wt %, the coating film is too soft and poor in wear resistance.

The weight-average molecular weight (Mw) of the (meth) acrylic copolymer resin (A) is in the range of 20,000 to 200,000, preferably 30,000 to 100,000. When the Mw is less than 20,000, the coating film is rendered brittle and poor in hardness and wear resistance, while when the Mw is higher than 200,000, formation of the coating film is insufficient thus deteriorating outward appearance in respect of gloss and turbidity.

The weight-average molecular weight (Mw) is determined by gel permeation chromatography (GPC) with polystyrene as standard.

The (meth)acrylic acid (a-1) in the present invention is acrylic acid and/or methacrylic acid.

The (meth)acrylic acidamide (a-2) in the present invention is acrylic acid amide and/or methacrylic acid amide.

The reactive unsaturated bond-containing compound (b) other than (a-1) and (a-2) contains (meth)acrylate as an essential ingredient and optionally contains at least one compound selected from styrene, maleic anhydride, maleic acid, fumaric acid, itaconic acid and monoesters thereof.

The (meth)acrylic copolymer resin (A) maybe copolymerized with other radical polymerizable monomers insofar as the calculated glass transition temperature (Tg3) is in the range of 50 to 150° C.

The (meth)acrylic copolymer resin (A) can be obtained by copolymerizing the (meth)acrylic acid (a-1), the (meth) acrylic acid amide (a-2) and the reactive unsaturated bond-containing compound (b) other than (a-1) and (a-2) in the presence of an initiator. The reactive unsaturated bond-containing compound (b) used in the present invention includes, but is not limited to, (meth)acrylates such as methyl (meth)acrylate, ethyl (meth) acrylate, propyl (meth) acrylate, n-butyl (meth) acrylate, i-butyl (meth)acrylate, t-butyl (meth)acrylate, 2-ethylhexyl (meth)acrylate, lauryl (meth)acrylate, stearyl (meth)acrylate, cyclohexyl (meth) acrylate and benzyl (meth)acrylate, and compounds having nitrogen-containing reactive unsaturated bonds, such as N,N-dimethylaminoethyl (meth)acrylate, N, N-diethylaminoethyl (meth) acrylate and (meth) acrylonitrile, and the compounds having functional group-containing reactive unsaturated bonds include compounds having hydroxyl group-containing reactive unsaturated bonds, such as 2-hydroxyethyl (meth)acrylate, hydroxypropyl (meth)acrylate, hydroxybutyl (meth)acrylate, polycaprolactone/hydroxyethyl (meth)acrylate adducts (Plaqucell F series (trade name) manufactured by Daicel Chemical Industries, Ltd.), polyethylene glycol/methacrylic acid adducts (Blenmer PE series (trade name) manufactured by Nippon Oil and Fats Co., Ltd.) and polypropylene glycol/methacrylic acid adducts (Blenmer PP series (trade name) manufactured by Nippon Oil and Fats Co., Ltd.), compounds having carboxyl group-containing reactive unsaturated bonds, such as maleic acid, maleic anhydride, itaconic acid and monoesters thereof, and compounds having glycidyl group-containing reactive unsaturated bonds, such as glycidyl (meth)acrylate, methylglycidyl (meth) acrylate, methylglycidyl (meth) acrylate and allylglycidyl (meth)acrylate. Styrene, α-methyl styrene, vinyl toluene, vinyl acetate, vinyl propionate, ethylene, propylene etc. are mentioned in addition to the (meth)acrylate monomers, and one or more of these compounds having reactive unsaturated bonds are used in copolymerization.

Solvent and Coating Solution

The solvent used in dissolving and dispersing the (meth) acrylic copolymer resin (A) in the present invention is not particularly limited insofar as the polymer is completely dissolved and removed by evaporation and two or more solvents may be mixed to attain preferable viscosity and evaporation rate for use in a coating solution and to prevent blushing of the coating film.

The organic solvent is preferably a mixture of solvent (c) dissolved in an arbitrary ratio in water and solvent (d) other than (c).

The solvent usable as the organic solvent (B) includes the solvent (c) dissolved in an arbitrary ratio in water, for example ether solvents such as ethylene glycol monomethyl, ethylene glycol monoethyl, ethylene glycol mono-n-propyl, ethylene glycol monoisopropyl and propylene glycol monomethyl, as well as alcohol solvents such as methanol, ethanol, propanol, isopropanol and butanol. The solvent (d) other than (c) includes, for example, alkyl benzene solvents such as benzene, toluene and xylene, acetate solvents such as ethyl acetate, propyl acetate, butyl acetate, amyl acetate, methyl acetoacetate, methyl Cellosolve and Cellosolve acetate, and ketone solvents such as dioxane, acetone, methyl ethyl ketone, methyl isobutyl ketone and cyclohexanone.

To form the coating film, the (meth)acrylic copolymer resin (A) and the organic solvent (B) in the present invention may be formed into a coating such that the solids content and viscosity of the coating are regulated according to an applicator and a coating method. The mixing ratio of (A) to (B) by weight, that is, (A)/(B)), is (5 to 80)/(95 to 20), preferably (10 to 70)/(90 to 30).

The radical polymerization initiator used in the acrylic copolymer resin (A) in the present invention includes organic peroxides such as benzoyl peroxide, t-butylperoxy-2-ethyl hexanoate, t-butyl hydroperoxide, cumene hydroperoxide etc., azo compounds such as N,N-azobisisobutyronitrile, 4,4-azobis(4-cyanopentanoic acid) etc. If necessary, a chain transfer agent such as dodecyl mercaptan, mercaptoethanol, α-methyl styrene dimer etc. can be used.

The coating resin composition of the present invention can further be blended if necessary with pigments, an UV absorber, an antioxidant, a leveling agent and fine particles, and the resulting coating composition can be used not only as topcoat and interlayer coatings but also as clear coating and color coating.

Method of Producing the Coating Film

The acrylic copolymer resin (A) in the present invention can be applied by each method onto a substrate etc. and dried by drying at room temperature to 110° C. for 20 seconds to form a coating film. The substrate includes, for example, iron, aluminum, zinc, stainless steel, metallic materials obtained by subjecting the above materials to surface treatment, vinyl chloride, polyethylene terephthalate, polyethylene, polypropylene, polycarbonate, and plastic materials obtained by subjecting the above materials to surface treatment. If necessary, these base materials can be coated with a primer, an interlayer coating and a top coating.

The coating resin of the present invention can be applied by a known coating method using spraying, brushing, a roller, dipping or a bar coater.

Method of Evaluating the Coating Film

The above diluted and regulated coating composition was applied by a bar coater to a thickness of 2 to 3 μm in terms of dry thickness onto a base material of polyvinyl chloride in a sheet form (thickness 1 mm×length 100 mm×width 100 mm), and then dried in an atmosphere at 110° C. by a hot-air dryer for about 20 seconds to prepare each test specimen. The resulting test specimen was observed and evaluated for the following items. The results are shown in Table 2.

State of the Coating Film (1) Outward appearance

① Transparency: The coating film on the test specimen thus prepared was observed with naked eyes, and evaluated according to the following criteria.

O: transparent

Δ: slightly cloudy x: not transparent (opaque)

② Cracking: The prepared test specimen coating film was observed with naked eyes, and evaluated according to the following criteria.

O: no cracking

Δ: slight cracking x: cracking (2) Adhesion (crosscut adhesion): The prepared coating film on the test specimen was observed in a crosscut adhesion test (K5400-8-5) and evaluated in terms of number of remaining crosscuts/number of crosscuts at the time of cutting.

(3) Solvent resistance: The prepared coating film on the test specimen was rubbed 50 times with a gauze impregnated with each solvent (acetone/toluene) and evaluated according to the following criteria:

O: no trace

Δ: slight trace x: evident trace or scratch

Physical Properties of the Coating Film (4) Wear resistance: The formed coating film on the test specimen was examined by a wear ring method (CS10F, loading 500 g) in a Taber abrasion testing method (JIS K5600-5-9), and the number of revolutions was read with naked eyes until the coating film was shaved or the coating film was removed from the base material.

(5) Tg1, Tg2 of the coating film: The coating used in formation of the test specimen was dried under conditions depending on the following measuring devices, and measurements were recorded.

① Rigid pendulum viscoelastometer: DDV-OPA III manufactured by A&D.

② DSC (differential scanning calorimeter): DSC-60A manufactured by Shimadzu Corporation.

EXAMPLES

Here in after, the present invention is described in more detail by reference to the Examples and Comparative Examples, but the present invention is not limited to these examples.

Example 1

A 5-L four-necked flask equipped with a stirrer, a thermometer, a nitrogen inlet tube and a reflux condenser was charged with 750 g isopropyl alcohol, 250 g toluene and 500 g methyl ethyl ketone, and while the flask was purged with nitrogen, the mixture was heated to 80° C. Just after heating, 100 g methacrylic acid, 40 g methacrylic acid amide, 502 g methyl methacrylate, 358 g isobutyl methacrylate and a polymerization initiator were continuously dropped into the mixture over 5 hours with a constant delivery pump, and thereafter the polymerization initiator was further added thereto and the mixture was kept for 3 hours to get methacrylic copolymer resin (A). Examples 2 to 8 and Comparative Examples 1 to 6

Resin solutions were prepared in the same manner as in Example 1 except that (meth)acrylic acid, (meth)acrylic acid amide, the compound having a reactive unsaturated bond, and the solvent composition etc. were changed as shown in Tables 1-1 and 1-2. The results are shown in Tables 1-1 and 1-2.

The resin solution obtained in each example was diluted and adjusted with MEK to a solids content of 200%. Each coating resin product thus diluted and regulated was applied by a bar coater to a thickness of 2 to 3 μm (in terms of dry thickness) onto a substrate in a sheet form (thickness 1 mm×length·width 100 mm), and dried in an atmosphere at 110° C. by a hot-air dryer for about 20 seconds to form each test specimen. The resulting test specimen was evaluated for its coating film in the respective items. The results are shown in Tables 2-1 and 2-2.

Abbreviations are meant as follows: ST, styrene; MMA, methyl methacrylate; EA, ethyl acrylate; BA, butyl acrylate; nBMA, n-butylmethacrylate; iBMA, isobutyl methacrylate; 2-EHA, 2-ethylhexyl acrylate; MAm, methacrylamide; MAc, methacrylic acid; AAc, acrylic acid; IPA, isopropanol; PM, propylene glycol monomethyl ether; TOL, toluene; and MEK, methyl ethyl ketone.

For Tg of compounds having various reactive unsaturated bonds used herein in calculation, Table 10-2 (Main starting monomers of coating acrylic resin) on pages 168–169 in Shin Kobunshi Bunko (New Polymer Library), Vol. 7, Introduction to Synthetic Resin for Coating (authored by Kyozo Kitaoka, Kobunshi Kankokai, Kyoto, 1974) was used.

TABLE 1-1

| | | | Used material: Theoretical Tg (° C.) of homopolymer is shown in parentheses. | Examples / Examples 1 to 8 | | | | | | | |
|---|---|---|---|---|---|---|---|---|---|---|---|
| | | | | -1 | -2 | -3 | -4 | -5 | -6 | -7 | -8 |
| (A) (Meth)acrylic copolymer resin | (a-1) (Meth)acrylic acid | | Mac (130) | 100 | 200 | 250 | 60 | 400 | 200 | 200 | |
| | | | Aac (106) | | | | | | | | 200 |
| | (a-2) (Meth)acrylic acid amide | | MAm (256) | 40 | 60 | 80 | 10 | 10 | 60 | 60 | 150 |
| | (b) Compound having a reactive unsaturated bond | | ST (100) | | | | | 120 | | | |
| | | | MMA (105) | 502 | 515 | 400 | 808 | 400 | 515 | 515 | 532 |
| | | | EA (-22) | | 25 | | | 70 | 25 | 25 | 118 |
| | | | nBA (-54) | | | | 122 | | | | |
| | | | nBMA (20) | 358 | 200 | | | | 200 | 200 | |
| | | | iBMA (67) | | | 270 | | | | | |
| | | | 2EHA (-85) | | | | | | | | |
| | | | Total | 1000 | 1000 | 1000 | 1000 | 1000 | 1000 | 1000 | 1000 |
| | | | Theoretical Tg3 (° C.) | 75.0 | 90.1 | 108.1 | 76.4 | 101.5 | 90.1 | 90.1 | 98.9 |
| (B) Solvent | (c) | | IPA | 750 | 1000 | | 1000 | 1000 | | 1000 | |
| | | | PM | | | 1000 | | | 1000 | | 1000 |
| | (d) | | TOL | 250 | | | | | | | |
| | | | MEK | 500 | 500 | 500 | 500 | 500 | 500 | 500 | 500 |
| | | | TOTAL | 1500 | 1500 | 1500 | 1500 | 1500 | 1500 | 1500 | 1500 |
| Coating solution | | | Solids content (%) | 40 | 40 | 40 | 40 | 40 | 40 | 40 | 40 |
| | | | Molecular weight (Mw) | 41000 | 66000 | 82000 | 43000 | 43000 | 58000 | 58000 | 58000 |

TABLE 1-2

Comparative Examples

Used material: Theoretical Tg (° C.) of homopolymer is shown in parentheses.

| | | | Comparative Examples 1 to 5 | | | | |
|---|---|---|---|---|---|---|---|
| | | | -1 | -2 | -3 | -4 | -5 |
| (A) (Meth)acrylic copolymer resin | (a-1) (Meth)acrylic acid | Mac (130) | | 20 | 100 | 510 | 100 |
| | | Aac (106) | | | | | |
| | (a-2) (Meth)acrylic acid amide | MAm (256) | | 40 | 0 | 40 | 200 |
| | (b) Compound having a reactive unsaturated bond | ST (100) | 200 | 656 | | | |
| | | MMA (105) | 651 | | 800 | 450 | 700 |
| | | EA (-22) | 149 | | | | |
| | | nBA (-54) | | | 200 | | |
| | | nBMA (20) | | | | | |
| | | iBMA (67) | | | | | |
| | | 2EHA (-85) | | 84 | 100 | | |
| | | Total | 1000 | 1000 | 1000 | 1000 | 1000 |
| | | Theoretical Tg3 (° C.) | 77.6 | 35.3 | 72.3 | 122.0 | 130.5 |
| (B) Solvent | (c) | IPA | 750 | 1000 | 1000 | 1000 | 1000 |
| | | PM | | | | | |
| | (d) | TOL | 250 | | | | |
| | | MEK | 500 | 500 | 500 | 500 | 500 |
| | | TOTAL | 1500 | 1500 | 1500 | 1500 | 1500 |
| Coating solution | | Solids content (%) | 40 | 40 | 40 | 40 | — |
| | | Molecular weight (Mw) | 47000 | 45000 | 31400 | 27500 | — |

TABLE 2-1

Evaluation results of coating film

| | | Examples 1 to 8 | | | | | | | |
|---|---|---|---|---|---|---|---|---|---|
| Evaluation Item | | -1 | -2 | -3 | -4 | -5 | -6 | -7 | -8 |
| Glass transition temperature: | theoretical Tg3 (° C.) | 75 | 90 | 108 | 76 | 102 | 90 | 90 | 99 |
| | Tg2 (° C.) by DSC | 130 | 150 | 165 | 120 | 150 | 145 | 145 | 130 |
| | Tg1 (° C.) by rigid pendulum viscoelastometer | 175 | 205 | 210 | 115 | 155 | 195 | 195 | 135 |
| Outward appearance: | transparency | ◯ | ◯ | ◯ | ◯ | ◯ | ◯ | ◯ | ◯ |
| | Cracking | ◯ | ◯ | ◯ | ◯ | ◯ | ◯ | ◯ | ◯ |
| Adhesion: | crosscut adhesion test | 95/100 | 100/100 | 100/100 | 100/100 | 100/100 | 100/100 | 100/100 | 100/100 |
| Solvent resistance: | Acetone | Δ | ◯ | ◯ | ◯ | ◯ | ◯ | ◯ | ◯ |
| | Toluene | ◯ | ◯ | ◯ | ◯ | ◯ | ◯ | ◯ | ◯ |
| Wear resistance: | Taber abrasion test (CS10, 500 g, number of revolutions) | 200 | 300 | 400 | 200 | 300 | 400 | 350 | 400 |

TABLE 2-2

Evaluation results of coating film

| | | Comparative Examples 1 to 5 | | | | | |
|---|---|---|---|---|---|---|---|
| Evaluation Item | | −1 | −2 | −3 | −4 | −5 | −6 |
| Glass transition temperature: | theoretical Tg3 (° C.) | 78 | 35 | 72 | 122 | 131 | |
| | Tg2 (° C.) by DSC | 85 | 45 | 110 | during film making | during synthesis | |
| | Tg1 (° C.) by rigid pendulum viscoelastometer | 85 | 50 | 105 | cracking | turbid | |
| Outward appearance: | transparency | X | Δ | ○ | ○ | not measurable | |
| | Cracking | ○ | ○ | ○ | X | | |
| Adhesion: | crosscut adhesion test | 80/100 | 80/100 | 80/100 | — | | |
| Solvent resistance: | Acetone | X | X | X | — | | |
| | Toluene | X | X | X | — | | |
| Wear resistance: | Taber abrasion test (CS10, 500 g, number of revolutions) | 10 | 20 | 20 | — | | |

According to the results shown in Tables 2-1 and 2-2, the outward appearance of the coating film was free of cracking, and the coating film being excellent in solvent resistance and adhesion with performance excellent in wear resistance was obtained in the Examples. In the Comparative Examples, on the other hand, the coating film was turbid or cracked, extremely poor in solvent resistance and wear resistance and evidently inferior to the coating film in the Examples.

INDUSTRIAL APPLICABILITY

For uses requiring durability against scratch and wear, the coating film is applied preferably onto metal and plastic materials of vehicles, automobile parts, home appliances, instruments etc., and is superior in wear resistance thus preventing scratch and wear.

The invention claimed is:

1. A wear-resistant coating film comprising (A) (meth)acrylic copolymer resin, wherein the glass transition temperature (Tg1) thereof as determined by a rigid pendulum viscoelastometer and the glass transition temperature (Tg2) thereof as determined by a differential scanning calorimeter (DSC) are in the range of 110° C. to 250° C. respectively, and the wear resistance thereof as determined by a Taber abrasion testing method is 80 times or more,
wherein the difference between the glass transition temperature (Tg1) as determined by a rigid pendulum viscoelastometer and the glass transition temperature (Tg3) thereof calculated from a monomer composition constituting the coating film is 30° C. or more and wherein the difference between the glass transition temperature (Tg2) as determined by a differential scanning calorimeter (DSC) and the glass transition temperature (Tg3) thereof calculated from a monomer composition constituting the coating film is 30° C. or more, and
wherein the (meth)acrylic copolymer resin (A) has a weight-average molecular weight (Mw) of 20,000 to 82,000, and is produced by radical polymerizing (a-1) 4 to 50 wt % of (meth)acrylic acid, (a-2) 0.5 to 17 wt % of (meth)acrylic acid amide, and (b) 35 to 95.5 wt % of compound having a reactive unsaturated bond other than (a-1) and (a-2), and the (meth)acrylic copolymer resin (A) is dissolved in an organic solvent (B).

2. The wear-resistant coating film according to claim 1, wherein the (meth)acrylic copolymer (A) has a calculated glass transition temperature (Tg3) of 50 to 150° C.

3. The wear-resistant coating film according to claim 1, wherein the (meth)acrylic copolymer (A) has a calculated glass transition temperature (Tg3) of 50 to 140° C.

4. The wear-resistant coating film according to claim 1, wherein the compound having a reactive unsaturated bond other than (a-1) and (a-2) is at least one compound selected from the group consisting of (meth)acrylates, compounds having nitrogen-containing reactive unsaturated bonds, compounds having carboxyl group-containing reactive unsaturated bonds, compounds having glycidyl group-containing reactive unsaturated bonds, styrene, a-methyl styrene, vinyl toluene, vinyl acetate, vinyl propionate, ethylene and propylene.

5. The wear-resistant coating film according to claim 1, wherein the organic solvent is a mixture of solvent (c) dissolved in water and solvent (d) other than (c).

6. A coating solution comprising a (meth)acrylic copolymer resin (A) dissolved in an organic solvent (B), said (meth)acrylic copolymer resin (A) having a weight-average molecular weight (Mw) of 20,000 or more and being produced by radical Dolymerizing (a-1) 4 to 50 wt % (meth)acrylic acid, (a-2) 0.5 to 17 wt % (meth)acrylic acid amide. and (b) 35 to 95.5 wt % compound having a reactive unsaturated bond other than (a-1) and (a-2).

7. The coating solution according to claim 6, wherein the compound having a reactive unsaturated bond other than (a-1) and (a-2) is at least one compound selected from the group consisting of (meth)acrylates, compounds having nitrogen-containing reactive unsaturated bonds, compounds having carboxyl group-containing reactive unsaturated bonds, compounds having glycidyl group-containing reactive unsaturated bonds, styrene, α-methyl styrene, vinyl toluene, vinyl acetate, vinyl propionate, ethylene and propylene.

8. The coating solution according to claim 6, wherein the organic solvent is a mixture of solvent (c) dissolved in water and solvent (d) other than (c).

* * * * *